US006461742B1

(12) United States Patent
Moens et al.

(10) Patent No.: US 6,461,742 B1
(45) Date of Patent: Oct. 8, 2002

(54) POLYESTER CONTAINING TERTIARY CARBOXYL GROUPS, PREPARATION METHOD AND THERMOSETTING POWDER COMPOSITIONS CONTAINING SAME

(75) Inventors: Luc Moens, Sint-Genesius-Rode; Kris Buysens, Oudenaarde; Daniel Maetens, Brussels, all of (BE)

(73) Assignee: UCB, S.A., Brussels (BE)

( * ) Notice: Subject to any disclaimer, the term of this patent is extended or adjusted under 35 U.S.C. 154(b) by 0 days.

(21) Appl. No.: 09/601,140

(22) PCT Filed: Feb. 3, 1999

(86) PCT No.: PCT/BE99/00015

§ 371 (c)(1),
(2), (4) Date: Jul. 27, 2000

(87) PCT Pub. No.: WO99/40143

PCT Pub. Date: Aug. 12, 1999

(30) Foreign Application Priority Data

Feb. 9, 1998 (BE) .............................................. 9800093

(51) Int. Cl.[7] ...................... C09D 167/02; C09D 167/04
(52) U.S. Cl. ...................... 428/482; 525/437; 525/438; 525/448; 525/934; 528/302; 528/305; 528/297; 427/461; 427/485; 427/486; 427/385.5; 427/388.2; 428/458
(58) Field of Search ................................. 528/302, 305, 528/297; 525/437, 448, 934; 428/482, 458; 427/461, 485, 486, 385.5, 388.2

(56) References Cited

FOREIGN PATENT DOCUMENTS

| DE | 1271392 | 6/1968 |
|---|---|---|
| EP | 0634434 | 1/1995 |
| WO | 95 01407 | 1/1995 |

*Primary Examiner*—Patricia A. Short
(74) *Attorney, Agent, or Firm*—Wenderoth, Lind & Ponack, L.L.P.

(57) ABSTRACT

The invention concerns a polyester bearing tertiary carboxyl groups, characterised in that it consists of: (a) 8.1 to 35 moles of an aliphatic or cycloaliphatic of a polyol; (b) 9.1 to 36 moles of an aliphatic, cycloaliphatic or aromatic polycarboxylic acid; (c) 1.6 to 2.8 moles of an aliphatic, cycloaliphatic or aromatic compound comprising a tertiary carboxyl group and either a primary or secondary carboxyl group, or a primary or secondary hydroxyl group. Said polyester is prepared in several steps, the first steps consisting in the preparation of a polyester by condensation between (a) an aliphatic or cycloaliphatic polyol, and (b) an aliphatic, cycloaliphatic or aromatic polycarboxylic acid, the final step consisting in condensing said polyester with (c) an aliphatic, cycloaliphatic or aromatic compound comprising a tertiary carboxyl group and either a primary or secondary carboxyl group, or a primary or secondary hydroxyl group. Said polyester is used in thermosetting powder compositions, mixed with a crosslinking agent which is more particularly a β-hydroxylalkylamide. Said compositions provide coatings with excellent surface appearance, good flexibility and good resistance to poor weather conditions.

20 Claims, No Drawings

POLYESTER CONTAINING TERTIARY CARBOXYL GROUPS, PREPARATION METHOD AND THERMOSETTING POWDER COMPOSITIONS CONTAINING SAME

This is a 371 application of PCT/BE99/00015 filed Feb. 3, 1999.

The present invention relates to novel polyesters containing tertiary carboxyl groups, to a process for their preparation and to thermosetting powder compositions containing, as binder, the said polyesters and a crosslinking agent capable of reacting with their carboxyl groups.

The invention also relates to the use of these compositions to prepare powdered paints and varnishes for making coatings, as well as to the coatings thus obtained.

Thermosetting powder compositions are well known in the state of the art and are widely used as paints and varnishes for coating a very varied range of objects. These powders have many advantages: on the one hand, the problems associated with the use of solvents is completely eliminated, on the other hand, the powders are used at 100%, given that only the powder in direct contact with the substrate is retained by that substrate, the excess of powder being, in principle, entirely recoverable and reusable. Consequently, these powdered compositions are preferred over coating compositions in the form of solutions in an organic solvent.

Thermosetting powder compositions have already found a large opening in the coating of household appliances, accessories for the motor vehicle industry, etc. They generally contain thermosetting organic compounds constituting the binder for the paint, fillers, pigments, catalysts and various additives to adapt their behaviour to their use.

Besides the thermosetting powder compositions, thermoplastic compositions in powder form also exist. These compositions comprise polymers which do not contain any reactive chemical groups. When this type of powder is heated on a substrate, the particles melt, coalesce and spread over the substrate to form a smooth and uniform coating.

In contrast, the polymers used in the thermosetting powder compositions contain a reactive chemical group, for example a carboxyl, hydroxyl or epoxide group. In this type of powder, a crosslinking agent is added which contains chemical groups which react with those of the polymers when the powder is fired on the substrate. This results in harder coatings which are more resistant to chemical agents, which adhere better to metal surfaces and which do not soften when they are exposed to high temperatures. However, the crosslinking of thermosetting powders creates a new series of problems when compared with thermoplastic powders. Firstly, the crosslinking can give rise to a lack of surface uniformity, which gives it an orange-peel appearance. This is due to the fact that, during its firing, the powder crosslinks before the powder particles have had the time to spread out to make a very uniform coat. Another consequence of this premature crosslinking is that air bubbles can remain trapped in the coating, which adversely affects its surface appearance, its adhesion to the substrate and its protective effect. Another problem encountered with thermosetting powder compositions is that of giving coatings which lack flexibility. When a coating is deposited on metal sheets intended to manufacture articles which will need to be folded at various angles, it is essential for the coating not to crack at the location of the fold. In addition, it is essential for the powder to be stable in storage. In other words, it must remain in a finely pulverulent state for a sufficiently long period, and must not reagglomerate, which implies that the polymer used as binder for the powder should have a sufficiently high glass transition temperature. Lastly, when the thermosetting powder composition is intended to make coatings on articles forming part of architectural constructions, it is very important for these coatings to withstand bad weather. In the latter case, it is common practice to use amorphous polyesters, bearing carboxyl groups, containing a majority of isophthalic acid as acidic constituent, as a mixture with triglycidyl isocyanurate (TGIC) as crosslinking agent. This does indeed give the coatings good resistance to photodegradation and to hydrolysis of the ester groups, but the coatings thus obtained do not have good impact strength. In addition, TGIC is tending to be used less than previously, since it exhibits health and safety problems. Specifically, TGIC is relatively toxic, its LD50 lethal dose being 0.4 g/kg orally in rats, and it is mutagenic according to the Ames mutagenicity test; it is also thought to give rise to allergic reactions, reflected by eczema and asthma.

Attempts have thus been made to replace TGIC with other crosslinking agents for polyesters bearing carboxyl groups. Among these, acrylic copolymers bearing epoxide groups have been used, as in patent EP 38635. However, binders containing these two types of compound give coatings whose impact strength and flexibility are not entirely satisfactory. Attempts have also been made to use beta-hydroxyalkylamides as crosslinking agents for polyesters bearing carboxyl groups. The hydroxyl group located in the beta position relative to the amide group is highly reactive in the esterification of the carboxyl group in the polyesters, which leads to problems as regards the rate of crosslinking of compositions containing this type of crosslinking agent. The reason for this is that, since this rate is high, the coating does not have enough time to spread out correctly when it melts, which leads to surface defects such as the formation of an orange-peel skin. In addition, this esterification is accompanied by a release of water, which does not have time to escape from the coating as it hardens, which also leads to surface defects.

Patent EP 322,834, for example, describes thermosetting powder compositions essentially containing a polyester bearing carboxyl groups and a beta-hydroxyalkylamide, which is applied to a substrate and is then crosslinked at a temperature of 160 to 200° C. Despite the presence of benzoin in these compositions, which is added as degassing agent, the bubbles of water and air remain trapped in the hardened coating after it has melted and crosslinked, especially if the coating is relatively thick. In addition, the flow of the powder when it melts is not optimal.

Patent application WO 91/14745 describes thermosetting powder compositions containing an amorphous polyester containing carboxyl groups, a semi-crystalline polyester containing carboxyl groups and a crosslinking agent. 10 to 40% by weight of the semi-crystalline polyester is preferably used relative to the polyesters as a whole, and the crosslinking agent can be a beta-hydroxyalkylamide. The presence of the semi-crystalline polyester in these compositions improves the mechanical properties of the coatings they provide. However, the presence of these semi-crystalline polyesters also increases the rate of hardening of these compositions, which could be a factor which disfavours the satisfactory flowing and degassing of these compositions when they melt, leading to surface defects in the coatings.

Patent application EP 668,895 also describes thermosetting powder compositions containing a polyester bearing carboxyl groups and a beta-hydroxyalkylamide. The polyesters of that patent application have a functionality of carboxyl groups of less than 2, obtained by adding monofunctional acids or alcohols during the synthesis of the polyester. By virtue of this reduced functionality, the polyester is less reactive, which makes the powder flow better when it melts and allows the bubbles of air and of water vapour to escape from the coating before it hardens, unlike the compositions in patent applications EP 322,834 and WO 91/14745. However, since the polyester contains chain ends which do not bear a reactive group, these ends do not participate in the formation of the three-dimensional network during the crosslinking of the powder, which reduces the resistance to solvents and the flexibility of the coatings thus obtained.

As can be appreciated, it is not easy to find a thermosetting powder composition which by itself combines all the qualities which it would be desired to find therein, such as good stability in storage, good flowing when melting in order to give it a smooth, taut and glossy appearance which has no orange-peel skin or bubbles, good flexibility and good surface hardness, at the same time as good resistance to solvents, to bad weather and to hydrolysis.

The present invention is aimed at providing thermosetting powder compositions which combine the qualities listed above, more particularly when these compositions contain a beta-hydroxyalkylamide as crosslinking agent.

Accordingly, the present invention relates to a polyester bearing tertiary carboxyl groups, which allows most of these problems to be solved. By finding a good compromise between the reactivity of the tertiary carboxyl groups in the polyester which contains them, its functionality and its acid number (factor which is in correlation with the molecular weight and which thus governs its viscosity, which is an essential factor for correct flowing of the composition in the molten state), coatings have been successfully produced, according to the present invention, the surface of these coatings having a very smooth and taut appearance, without any orange-peel skin or bubbles retained in the coating. In addition, these coatings have very good flexibility and very good resistance to bad weather and to hydrolysis.

The invention also provides a specific process for preparing these polyesters in several steps, the tertiary carboxyl groups mainly being found at the end of the polyester chains.

Lastly, the invention relates to thermosetting powder compositions containing this polyester and a crosslinking agent, as well as to the use of these compositions to prepare powdered paints and varnishes, which give coatings which combine most of the favourable properties listed above.

One of the subjects of the present invention is thus a polyester bearing tertiary carboxyl groups, characterized in that it consists of:

(a) 8.1 to 35 mol of an aliphatic or cycloaliphatic polyol,
(b) 9.1 to 36 mol of an aliphatic, cycloaliphatic or aromatic polycarboxylic acid,
(c) 1.6 to 2.8 mol of an aliphatic, cycloaliphatic or aromatic compound containing, on the one hand, a tertiary carboxyl group, and, on the other hand, either a primary or secondary carboxyl group or a primary or secondary hydroxyl group.

This number of moles of constituents in (a), (b) and (c) is relative to one mole of the polyester containing them.

The aliphatic or cycloaliphatic polyol (a) is chosen from neopentyl glycol, 2,2-butylethyl-1,3-propanediol, neopentyl glycol hydroxypivalate, 1,4-cyclohexanedimethanol, trimethylolpropane, ditrimethylolpropane, pentaerythritol, etc. Preferably, from 40 to 100%, and better still from 60 to 100%, by weight of an aliphatic diol containing two primary hydroxyl groups, in particular neopentyl glycol, is used relative to the entire weight of the polyols.

The aliphatic, cycloaliphatic or aromatic polycarboxylic acid (b) is chosen from isophthalic acid, terephthalic acid, phthalic acid or anhydride, 1,2-cyclohexanedicarboxylic acid, 1,3-cyclohexanedicarboxylic acid, 1,4-cyclohexanedicarboxylic acid, etc. Preferably, from 85 to 100% by weight of a dicarboxylic aromatic acid, in particular terephthalic acid and/or isophthalic acid, is used relative to the entire weight of the polycarboxylic acids.

The aliphatic, cycloaliphatic or aromatic compound (c) containing, on the one hand, a tertiary carboxyl group, and, on the other hand, a primary or secondary carboxyl or hydroxyl group, can be represented by the general formula I below:

in which $R^1$ and $R^2$ mean, independently of each other, an alkyl group containing from 1 to 12 carbon atoms, a cycloalkyl group or an aryl group;

Y represents a carboxyl or hydroxyl group;

$R^3$ represents a hydrogen atom or has the same meaning as $R^1$ or $R^2$; preferably, $R^3$ represents a hydrogen atom.

When Y represents a hydroxyl group in formula I, the compound (c) is a hydroxy acid containing a primary or secondary hydroxyl group, preferably a primary group, and a tertiary carboxyl group, which can be chosen from hydroxypivalic acid (or 3-hydroxy-2,2-dimethylpropanoic acid), 3-hydroxy-2,2-diphenylpropanoic acid, 3-hydroxy-2-methyl-2-phenylpropanoic acid, 2-(hydroxymethyl)-2-methylbutanoic acid, 2-ethyl-2-(hydroxymethyl)butanoic acid, 2-(hydroxymethyl)-2-phenylbutanoic acid, 2-(hydroxymethyl)-3-methyl-2-phenylbutanoic acid, 2-(hydroxymethyl)-2-methylpentanoic acid, 2-ethyl-2-(hydroxymethyl)pentanoic acid, 2-(hydroxymethyl)-2-propylpentanoic acid, 2-(hydroxymethyl)-2-phenylpentanoic acid, 2-ethyl-2-(hydroxymethyl)hexanoic acid, 2-butyl-2-(hydroxymethyl)hexanoic acid, 2-(hydroxymethyl)-2-phenylhexanoic acid, 2-heptyl-2-(hydroxymethyl)decanoic acid, etc. Among these compounds, hydroxypivalic acid is preferred.

When Y represents a carboxyl group in formula I, compound (c) is a diacid containing a tertiary carboxyl group and a primary or secondary carboxyl group, preferably a primary group, which can be chosen from 2,2-dimethylsuccinic acid, 2-ethyl-2-methylsuccinic acid, 2,2-diethylsuccinic acid, 2-methyl-2-propylsuccinic acid, 2-isopropyl-2-methylsuccinic acid, 2-ethyl-2-propylsuccinic acid, 2,2-dipropylsuccinic acid, 2-hexyl-2-methylsuccinic acid, 2-heptyl-2-methylsuccinic acid, 2,2-bis(2-methylpropyl)succinic acid, 2,2-bis(isobutyl)succinic acid, 2-decyl-2-methylsuccinic acid, 2-decyl-2-propylsuccinic acid, 2-methyl-2-phenylsuccinic acid, 2-ethyl-2-phenylsuccinic acid, 2-phenyl-2-propylsuccinic acid, 2-butyl-2-phenylsuccinic acid, 2-pentyl-2-phenylsuccinic acid, 2-hexyl-2-phenylsuccinic acid, 2-heptyl-2-phenylsuccinic acid, 2-octyl-2-phenylsuccinic acid, 2,2-diphenylsuccinic acid, etc. The anhydrides corresponding to all these acids can also be used. Among these compounds, 2,2-dimethylsuccinic acid or its anhydride is preferably used.

The polyester bearing tertiary carboxyl groups according to the invention has an acid number of from 15 to 50 mg of KOH/g, preferably from 25 to 35 mg of KOH/g, and a hydroxyl number of from 0 to 10 mg of KOH/g. Its number-average molecular weight ranges from 1800 to 10,500, preferably from 2900 to 5000. The functionality of this polyester ranges from 1.6 to 2.8, preferably from 1.85 to 2.25. Its ICI viscosity, measured by the cone/plate method at 200° C., ranges from 10 mPa.s to 10,000 mPa.s and its glass transition temperature is between 45 and 85° C., when measured by differential scanning calorimetry (DSC), with a temperature increase of 20° C./min. The standards applied to determine these values are outlined at the start of the examples which follow.

Another subject of the present invention is a process for preparing a polyester bearing tertiary carboxyl groups, characterized in that it is carried out in several steps, the first steps consisting in preparing a prepolyester by condensation between (a) an aliphatic or cycloaliphatic polyol, and (b) an aliphatic, cycloaliphatic or aromatic polycarboxylic acid, the final step consisting in condensing this prepolyester with (c) an aliphatic, cycloaliphatic or aromatic compound containing, on the one hand, a tertiary carboxyl group, and, on the other hand, either a primary or secondary carboxyl group or a primary or secondary hydroxyl group.

More particularly, in this preparation process:

(1) (i) a prepolyester bearing hydroxyl groups is first prepared by condensation between compounds (a) and (b), using a stoichiometric excess of the polyol (a) relative to the polycarboxylic acid (b),
  (ii) the prepolyester obtained in (1) (i) is then condensed with a polycarboxylic acid (b), with the exception, however, of terephthalic acid, in order to form a prepolyester bearing carboxyl groups, and
  (iii) lastly, the prepolyester obtained in (1) (ii) is condensed with a compound (c) containing, on the one hand, a tertiary carboxyl group, and, on the other hand, a primary or secondary hydroxyl group; or alternatively (2) (i) a prepolyester bearing hydroxyl groups is first prepared as in (1) (i),
  (ii) this prepolyester is then condensed with a compound (c) containing, on the one hand, a tertiary carboxyl group, and, on the other hand, a primary or secondary carboxyl group; or alternatively (3) (i) a prepolyester bearing carboxyl groups is first prepared by condensation between compounds (a) and (b), using a stoichiometric excess of the polycarboxylic acid (b) relative to the polyol (a), with the exception, however, of terephthalic acid,
  (ii) the prepolyester obtained in (3) (i) is then condensed with a compound (c) containing, on the one hand, a tertiary carboxyl group, and, on the other hand, a primary or secondary hydroxyl group.

The compounds (a), (b) and (c) used to prepare the polyester bearing tertiary carboxyl groups are the same as those described above with respect to the polyester according to the invention. The molar amounts in which they are present are also the same. The acid number and hydroxyl number, molecular weight, functionality, viscosity and glass transition temperature values which characterize the polyesters obtained by this synthetic process are also those of the polyester bearing tertiary carboxyl groups according to the invention.

This specific synthetic method, in which the compound (c) is used in the final step of the synthesis, ensures the production of a polyester in which the tertiary carboxyl groups are mainly at the ends of the polyester chains, without virtually having reacted at all. The primary and/or secondary and/or aromatic hydroxyl and carboxyl groups in compounds (a) and (b) have, on the other hand, reacted together almost completely. As will be seen later in a comparative example, if an attempt is made to synthesize the polyester according to the invention in a single step, using diols containing primary hydroxyl groups as compounds (a), these diols react with the tertiary carboxyl groups of the compound (c) of formula I, such that the latter compound is incorporated in a large amount into the polyester chain, thus not making it possible to obtain a polyester according to the invention, in which the tertiary carboxyl groups are mainly at the end of the polyester chains.

Patent application EP 634,434 describes a linear polyester containing tertiary aliphatic carboxyl groups as a constituent of a thermosetting powder composition. This polyester is synthesized in a single step and contains:

at least one monofunctional compound comprising a primary or secondary hydroxyl group and/or at least one compound comprising a primary or secondary hydroxyl group and a tertiary aliphatic carboxyl group;

at least one aromatic or cycloaliphatic dicarboxylic acid comprising two aromatic or secondary aliphatic carboxyl groups;

at least one diol comprising two primary or secondary hydroxyl groups;

at least one dihydroxymonocarboxylic acid comprising a tertiary carboxyl group and two primary or secondary aliphatic hydroxyl groups.

In this polyester, only unreacted tertiary carboxyl groups remain, the other carboxyl groups having completely reacted with the hydroxyl groups. According to the examples in that patent application, all the linear polyesters containing, the tertiary aliphatic carboxyl groups prepared contain hydrogenated bisphenol A, which is a preferred compound according to that patent application, as sole diol, i.e. a diol whose hydroxyl groups are secondary. In fact, the one-step synthetic method described in that patent application is, with the compounds used, only possible with secondary diols, which react with tertiary carboxyls with great difficulty, but which can react with secondary carboxyls, such as those of the hexahydrophthalic acid used in the examples, and which is the preferred compound according to that patent application. In contrast, as seen above, it is not possible to synthesize the polyesters bearing tertiary carboxyl groups of the present invention in a single step.

The polyesters prepared in the examples in that patent application have two major drawbacks compared with those of the present invention. Specifically, the vast majority of the monomers used to prepare them are aliphatic and cycloaliphatic compounds, and it is known that this type of monomer gives polyesters whose resistance to bad weather is unsatisfactory. Moreover, the acid number of these polyesters ranges from 67.3 to 87.0 mg of KOH/g, and these very high values increase the reactivity of these polyesters to the point of completely counterbalancing the beneficial effect of the reduced reactivity of the tertiary carboxyl groups they contain, which is an obstacle to slowing down the crosslinking reaction, which is precisely the cause of the favourable results obtained according to the present invention.

The polyester bearing tertiary carboxyl groups according to the invention can be prepared by bulk polycondensation, in two or three steps, using a standard polyesterification reactor, equipped with a stirrer, a distillation column connected to a water-cooled condenser, a nitrogen inlet and a thermometer connected to a temperature regulator.

According to the three-step process of the invention (1), the polycarboxylic acids (b) are placed in the reactor with a stoichiometric excess of the polyols (a), with stirring, at a temperature of from 120 to 150° C., under nitrogen and in the presence of an esterification catalyst. The temperature is increased to 200–250° C., while the water begins to distil off at 190° C. When the distillation at atmospheric pressure stops, the prepolyester bearing hydroxyl groups is cooled and a polycarboxylic acid (b) other than terephthalic acid (which is too insoluble according to this process) is added thereto. In this second step, carboxylation and an optional chain extension of the prepolyester are carried out, at a temperature of 200–250° C., first at atmospheric pressure and then under vacuum, until the desired prepolyester is obtained, according to its acid number, its hydroxyl number and its viscosity. In a third step, compound (c) bearing a tertiary carboxyl group and a primary or secondary hydroxyl group is added, between 180 and 200° C., with stirring. The reaction is continued at 225–250° C., under vacuum, until the desired acid and hydroxyl numbers and the desired viscosity are obtained. The usual additives can be added to the polyester bearing tertiary carboxyl groups, which is thus obtained, before emptying the reactor.

According to the two-step process of the invention (2), a prepolyester bearing hydroxyl groups is first prepared in the same way as in step one of process (1). During the second step, compound (c) containing a tertiary carboxyl group and a primary or secondary carboxyl group is added between 180 and 200° C. and with stirring. The reaction is continued at a temperature of from 180 to 220° C., under vacuum, until the desired acid and hydroxyl numbers and the desired viscosity are obtained. An alternative to this second step consists in using the anhydride of the same compound (c), at a temperature of from 160 to 200° C., with stirring, until the desired acid and hydroxyl numbers and the desired viscosity are obtained. The usual additives can be added to the polyester bearing tertiary carboxyl groups, which is thus obtained, before emptying the reactor.

According to the two-step process of the invention (3), a prepolyester bearing carboxyl groups is first prepared by adding a stoichiometric excess of one or more polycarboxylic acids (b), other than terephthalic acid (since it is too insoluble according to this process), to the polyols (a) at a temperature of from 120 to 150° C., under nitrogen and with stirring, in the presence of an esterification catalyst. The temperature is increased to 200–250° C., while the water begins to distil off at 190° C. When the distillation at atmospheric pressure stops, the condensation is continued under vacuum until the desired prepolyester bearing carboxyl groups is obtained, according to its acid number, its hydroxyl number and its viscosity. In a third step, compound (c) bearing a tertiary carboxyl group and a primary or secondary hydroxyl group is added, between 180° and 200° C., with stirring. The reaction is continued at 225–250° C. under vacuum, until the desired acid and hydroxyl numbers and the desired viscosity are obtained. The usual additives can be added to the polyester bearing tertiary carboxyl groups, which is thus obtained, before emptying the reactor.

Examples of an esterification catalyst which is used are tin derivatives, such as dibutyltin dilaurate, dibutyltin oxide or n-butyltin trioctanoate, or titanium derivatives, such as tetrabutoxytitanate. From 0 to 1% of phenolic derivatives, such as Irganox 1010, can be added as antioxidant, alone or with various stabilizers of the phosphite type, such as tributyl phosphite.

The present invention also relates to thermosetting powder compositions containing the polyester bearing tertiary carboxyl groups in accordance with the invention and a crosslinking agent bearing functional groups capable of reacting with the carboxyl groups of the polyester. The invention also relates to the preparation of powdered varnishes and paints, as well as to the powdered varnishes and paints obtained using these compositions.

Lastly, the invention also relates to a process for coating an article, preferably a metal article, which is characterized by applying a thermosetting powder composition, in accordance with the invention, to the said article by deposition with an electrostatic or triboelectric spray gun or by deposition in a fluidized bed, followed by heating the coating thus obtained to a temperature of from 160 to 225° C. for a period of about 5 to 30 minutes.

The crosslinking agent used to prepare the thermosetting powder compositions in accordance with the invention is chosen from compounds containing functional groups capable of reacting with the carboxyl groups of the polyester bearing tertiary carboxyl groups. Among these compounds which are used as crosslinking agents are:

polyepoxidized compounds which are solid at ordinary temperature and which contain at least two epoxy groups per molecule, such as, for example, triglycidyl isocyanurate (such as the product sold under the name Araldite PT 810 by the company Ciba-Geigy), although this is not preferred on account of its toxicity, or the epoxy resin Araldite PT 910 (from the same company), which contains a 75/25 mixture of diglycidyl terephthalate and triglycidyl trimellitate, or alternatively the product of reaction of 2,2-bis(4-hydroxyphenyl) propane and of epichlorohydrin, such as GT 7004 from the company Ciba-Geigy or Epikote 1055 from the company Shell.

acrylic copolymers containing glycidyl groups, obtained from glycidyl methacrylate and/or from glycidyl acrylate and from a (meth)acrylic monomer and optionally from an ethylenically monounsaturated monomer other than glycidyl (meth)acrylate and other than the (meth)acrylic monomer. An example of this type of acrylic copolymer is GMA252 sold by the company Estron Chemical Inc.

beta-hydroxyalkylamides which contain at least one, preferably two, bis(beta-hydroxyalkyl)amide groups, for example those mentioned in patent applications WO 91/14745, EP 322,834 and EP 473,380 and in U.S. Pat. Nos. 4,727,111, 4,788,255 and 4,076,917. These beta-hydroxyalkylamides, which are the preferred crosslinking agents according to the present invention, correspond to the general formula II below:

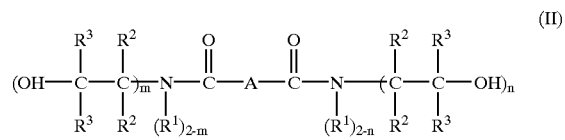

(II)

in which A represents a mono- or polyvalent organic group derived from saturated or unsaturated alkyl groups containing from 1 to 60 carbon atoms, or an aryl group, or a trialkene-amino group containing from 1 to 4 carbon atoms, or a carboxy-alkenyl group or alternatively an alkoxy-carbonyl-alkenyl group;

$R^1$ represents a hydrogen atom or an alkyl group containing from 1 to 5 carbon atoms, or alternatively a hydroxyalkyl group containing from 1 to 5 carbon atoms;

$R^2$ and $R^3$ are identical or different and represent, independently, a hydrogen atom or a linear or branched alkyl group containing from 1 to 5 carbon atoms, it also being possible for one of the groups $R^2$ and one of the groups $R^3$ to form a cycloalkyl group with the carbon atom adjacent to it;

m and n are between 1.6 and 2.0;

preferably, A represents an alkyl group containing from 1 to 10 carbon atoms;

$R^1$ represents a hydrogen atom or a hydroxyalkyl group containing from 1 to 5 carbon atoms;

$R^2$ and $R^3$ represent a hydrogen atom or a methyl or ethyl group.

The preferred beta-hydroxyalkylamides correspond to the general formula III below:

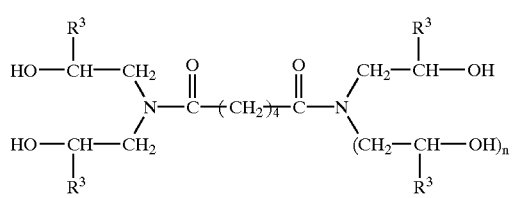

in which n ranges from 0.2 to 1 and $R^3$ can be a hydrogen atom (product sold under the name Primid XL 552 by the company EMS) or a methyl group (product sold under the name Primid QM 1260 by the company EMS).

The thermosetting powder compositions in accordance with the invention can also contain, besides the polyester bearing tertiary carboxyl groups and the crosslinking agent, a semi-crystalline polyester bearing carboxyl groups, in a minor amount relative to the polyesters as a whole, for example from 0 to 40% by weight. Such semi-crystalline polyesters are well known in the state of the art, for example in patent application WO 91/14745. Their acid number is between 10 and 70 mg of KOH/g, preferably between 15 and 40 mg of KOH/g, and their number-average molecular weight ranges from 1600 to 17,000, preferably from 2800 to 11,200; they have a glass transition temperature of from 10 to 50° C., a melting range of from 70 to 150° C. and an ICI viscosity of from 10 to 10,000 mPa.s, at 175° C. The presence of these semi-crystalline polyesters bearing carboxyl groups in the thermosetting compositions in accordance with the invention can contribute in certain cases towards further improving the surface appearance, the flexibility and the resistance to bad weather of the coatings.

The crosslinking agent described above is used in a proportion of from 0.25 to 1.4, preferably from 0.5 to 1.05, equivalents of epoxy or beta-hydroxyalkyl groups, per equivalent of carboxyl groups existing in the polyester bearing tertiary carboxyl groups and the semi-crystalline polyester bearing carboxyl groups which is optionally present.

The thermosetting powder compositions in accordance with the invention can contain, for example, from 97 to 60 parts by weight of the polyester bearing tertiary carboxyl groups and of the semi-crystalline polyester, and from 3 to 40 parts by weight of crosslinking agent, relative to the total weight of the polyesters and of the crosslinking agent.

The thermosetting powder compositions in accordance with the invention can also contain various auxiliary substances conventionally used in the manufacture of powdered paints and varnishes.

The auxiliary substances optionally added to the thermosetting compositions in accordance with the invention are, inter alia, compounds which absorb ultraviolet rays, such as Tinuvin 900 (from Ciba-Geigy Corp.) and light-stabilizers based on sterically hindered amines (for example Tinuvin 144 from Ciba-Geigy Corp.). A variety of inorganic pigments and fillers can also be added to the thermosetting compositions in accordance with the invention. As examples of pigments and fillers, mention will be made of metal oxides such as titanium dioxide, iron oxide, zinc oxide, etc., metal hydroxides, metal powders, sulphides, sulphates, carbonates, silicates such as, for example, aluminium silicate, carbon black, talc, kaolins, barytas, ultramarine blues, lead blues, organic reds, organic browns, etc. Auxiliary substances which will also be mentioned are fluidity modifiers such as Resiflow PV5 (from Worlee) or Modaflow (from Monsanto), or Acronal 4F (from BASF), plasticizers such as dicyclohexyl phthalate, triphenyl phosphate, auxiliary grinding agents, desiccating oils and degassing agents such as benzoin. These auxiliary substances are used in usual amounts, it being understood that if the thermosetting compositions in accordance with the invention are used as varnishes, the addition of auxiliary substances with opacifying properties will be omitted.

For the preparation of the thermosetting powder compositions, the constituents of the composition are dry-mixed, for example in a drum mixer. This mixture is then homogenized at a temperature within the range from 80 to 150° C. in an extruder, for example a Buss-Ko-kneader single-screw extruder or a Prism or A.P.V. twin-screw extruder. Next, the extrudate is left to cool, it is ground, optionally at very low temperature using liquid nitrogen, and is screened in order to obtain a powder whose particle size is between 10 and 150 micrometres.

The powdered paints and varnishes thus obtained are entirely suitable for application to the article to be coated by conventional techniques, i.e. by the well-known technique of deposition in a fluidized bed or by application using an electrostatic or triboelectric spray gun. In the latter case, additives known to increase the charging-up in triboelectric systems are added.

After they have been applied to the article concerned, the coatings deposited are cured by heating in an oven at a temperature of from 160 to 225° C. for a period of about 5 to 30 minutes in order to obtain complete crosslinking of the coating.

The examples which follow illustrate the invention without limiting it. In these examples, the determination of certain characteristic values was carried out according to the methods described below:

the gloss: this is expressed as the intensity of the reflected light, as a percentage, relative to the intensity of the light incident at an angle of 60° and measured according to ASTM standard D 523;

the impact strength: this is measured using a Gardner machine according to ASTM standard D 2794. Cold-rolled steel panels provided with a cured coating are subjected to impacts of increasing intensity on the coated side (direct impact) and on the uncoated side (reverse impact). The largest impact which does not cause the coating to crack is reported in kg.cm;

the QUV accelerated ageing test: chromium-plated aluminium panels provided with a cured coating to be tested are placed in a "QUV panel" test machine from the company Q-Panel Co. (Cleveland, USA), and subjected to several cycles of exposure to UV lamps and to moisture, at various temperatures.

Among the various cycles of this type which are described in ASTM standard G 53-88, the coatings in the present case were subjected to a cycle of exposure for 8 hours to a fluorescent UVA lamp (340 nm wavelength and 0.77 W/m²/ nm intensity) which simulates the harmful effects of sunlight, at 60° C., and of 4 hours of water vapour condensation, with the lamp switched off, at 40° C.; the change in gloss, measured at an angle of 60°, according to ASTM standard D 523, is noted. Every 200 hours of exposure to this test, the gloss retention is determined according to the equation:

$$\% \text{ retention} = \frac{60° \text{ gloss after 200 hours of exposure}}{60° \text{ gloss at the start of the experiment}} \times 100$$

the acid number and the hydroxyl number were determined by titration according to DIN standards 53402 and 53240, and expressed as mg of KOH per gram of polyester;

the glass transition temperature (Tg) and the melting point (Tm) were determined by differential scanning calorimetry (DSC) at a scanning speed of 20° C. per minute;

the number-average molecular weight ($\overline{Mn}$) of the polyesters was determined by gel permeation chromatography (GPC), with monodispersed polystyrene as standard;

the melt viscosity of the polyesters, expressed in mPa.s, was measured using an ICI cone-and-plate viscometer according to ASTM standard D 4287-88; it is also known as the "ICI viscosity" and was measured at the temperatures indicated in the examples;

the resistance to acidic hydrolysis of the coatings is indicated by the Delta-b* values according to the method for measuring the L*a*b* colours by the "Compagnie Internationale d'Eclairage". To do this, ISO standard 3231 is applied, modifying, however, the amount of sulphur dioxide (2 instead of 0.2 ) (determination of the resistance to wet atmospheres containing sulphur dioxide). Chromium-plated aluminium panels coated with compositions of formulation C (compositions 20 to 22 and 25 according to the invention and comparative composition 32) are subjected to an acidic wet atmosphere for 25 successive test cycles. A test cycle consists in placing the panels for 8 hours, at 45° C., in an atmosphere containing 2 liters of sulphur dioxide, followed by degassing at room temperature for 16 hours. After each cycle, the Delta-b* value is measured using a spectrophotometer with a measuring geometry of 0/45°, with a D65 type light source. Using the CIE-L*a*b* method, the b* value indicates a blue/yellow colour variation. The green-coloured compositions in the formulations C containing the yellow pigment Sicomin LS 1522 turn blue on exposure to acidic conditions, on account of the destruction of the pigment LS 1522, if the coatings no longer protect the pigment due to a lack of resistance to the acidic hydrolysis conditions. At least, the Delta-b* value is high, at most, the resistance to the acidic hydrolysis conditions is high; a coating is considered to be sufficiently resistant to the acidic hydrolysis if its Delta-b* value is less than 5 after 25 cycles. Except where otherwise indicated, the parts indicated in the examples are parts by weight.

EXAMPLE 1

Three-stage Synthesis of a Polyester Containing Tertiary Carboxyl Groups

First Stage:

395.52 parts of neopentyl glycol are placed in a 4-necked round-bottomed flask fitted with a stirrer, a distillation column connected to a water-cooled condenser, a nitrogen inlet and a thermometer connected to a temperature controller. The contents of the flask are heated to a temperature of 140° C., under nitrogen and with stirring, and 568.65 parts of terephthalic acid and 1.25 parts of n-butyltin trioctanoate are added thereto. The reaction is continued at 240° C. and at atmospheric pressure until 95% of the theoretical amount of water has been distilled off and the reaction mixture is transparent. A prepolymer containing hydroxyl groups is thus obtained, which has the owing characteristics:

| Acid number (IA): | 7.6 mg of KOH/g |
|---|---|
| Hydroxyl number (IOH): | 56.6 mg of KOH/g |
| ICI viscosity at 175° C.: | 2200 mPa · s |

Second Stage:

110.86 parts of isophthalic acid are added, at 200° C., to the prepolymer obtained in the first stage and the mixture is heated to 230° C. After 2 hours at this temperature, and when the reaction mixture is transparent, 1.0 part of tributyl phosphite and 1.0 part of n-butyltin trioctanoate are added thereto and the contents of the flask are placed under a pressure of 50 mmHg. After 3 hours at this temperature and under this pressure, the polyester obtained has the following characteristics:

| IA: | 35.5 mg of KOH/g |
|---|---|
| IOH: | 2.5 mg of KOH/g |
| ICI viscosity at 200° C.: | 5000 mPa · s |

Third Stage:

69.38 parts of hydroxypivalic acid and 1.0 part of n-butyltin trioctanoate are added, at 180° C., to the prepolymer obtained in the second stage. The mixture is then gradually heated to 230° C. After about half an hour at this temperature, the reaction mixture is placed under a pressure of 50 mmHg when it has become transparent. After three hours at this temperature and under this pressure, the polyester has the following characteristics:

| IA: | 34.2 mg of KOH/g |
|---|---|
| IOH: | 3.5 mg of KOH/g |
| ICI viscosity at 200° C.: | 3500 mPa · s |
| Tg (DSC; 20° C./min): | 53° C. |
| $\overline{Mn}$: | 2980 |

The polyester containing tertiary carboxyl groups thus obtained is cooled to 180° C. and removed from the flask.

EXAMPLES 2 to 5

Three-stage Synthesis of Polyesters Containing Tertiary Carboxyl Groups

Working in the same way as in Example 1, a series of other polyesters containing tertiary carboxyl groups was prepared. The monomer composition of these olyesters is given in Table 1, along with the characteristics obtained in the various steps.

In this Table 1, the various compounds used to repare the polyesters are denoted by the following abbreviations:

| | |
|---|---|
| NPG: | neopentyl glycol |
| TMP: | trimethylolpropane |
| NHP: | neopentyl glycol hydroxy-pivalate |
| BEPD: | 2,2-butylethyl-1,3-propanediol |
| TPA: | terephthalic acid |
| iPA: | isophthalic acid |
| HPA: | hydroxypivalic acid |
| Catalyst: | n-butyltin trioctanoate |
| Antioxidant: | tributyl phosphite |

TABLE 1

| | Example 2 | Example 3 | Example 4 | Example 5 |
|---|---|---|---|---|
| *First step* | | | | |
| NPG | 405.9 | 359.7 | 312.0 | 388.0 |
| NHP | — | 63.5 | — | — |
| TMP | — | — | — | 7.14 |
| BEPD | — | — | 106.7 | — |
| TPA | 583.6 | 561.5 | 557.1 | 340.42 |
| IPA | — | — | — | 229.37 |
| Catalyst: | 1.3 | 1.3 | 1.3 | 1.25 |
| IA (mg KOH/g) | 10.5 | 11.0 | 8.7 | 8.5 |
| IOH (mg KOH/g) | 61.2 | 60.2 | 58.7 | 56.0 |
| ICI (175° C. in mPa · s) | 2000 | 1900 | 1500 | 2000 |
| *Second step* | | | | |
| iPA | 101.9 | 101.9 | 101.9 | 111.04 |
| Catalyst | 1.0 | 1.0 | 1.0 | 1.0 |
| Antioxidant | 1.0 | 1.0 | 1.0 | 1.0 |
| IA (mg KOH/g) | 28.7 | 28.5 | 28.2 | 35.0 |
| IOH (mg KOH/g) | 2.1 | 1.9 | 4.8 | 3.0 |
| ICI (200° C. in mPa · s) | 7300 | 6800 | 5600 | 5500 |
| *Third step* | | | | |
| HPA | 54.3 | 54.3 | 54.3 | 69.38 |
| Catalyst | 1.0 | 1.0 | 1.0 | 1.0 |
| IA (mg KOH/g) | 28.0 | 27.8 | 28.5 | 34.0 |
| IOH (mg KOH/g) | 3.6 | 3.4 | 4.3 | 3.0 |
| ICI (200° C. in mPa · s) | 5400 | 4600 | 4000 | 4000 |
| Tg in ° C. (DSC; 20° C./min) | 54 | 52 | 50 | 51 |
| $\overline{M}n$ | 3550 | 3600 | 3420 | 3400 |

EXAMPLE 6

Two-stage Synthesis of a Polyester Containing Tertiary Carboxyl Groups

First Stage:

431.37 parts of neopentyl glycol are placed in a 4-necked round-bottomed flask fitted with a stirrer, a distillation column connected to a water-cooled condenser, a nitrogen inlet and a thermometer connected to a temperature controller. The contents of the flask are heated to a temperature of 140° C., under nitrogen and with stirring, and 639.54 parts of terephthalic acid and 2.3 parts of n-butyltin trioctanoate are added thereto. The reaction is continued at 240° C. and at atmospheric pressure until 95% of the theoretical amount of water has been distilled off. When the reaction mixture is transparent, 0.1 part of tributyl phosphite is added thereto and it is placed under a pressure of 50 mmHg. After two hours at this temperature and under this pressure, a prepolymer containing hydroxyl groups is obtained which has the following characteristics:

| | |
|---|---|
| IA: | 2.8 mg of KOH/g |
| IOH: | 36.7 mg of KOH/g |
| ICI viscosity at 200° C.: | 5900 mPa · s |

Second Stage:

75.14 parts of 2,2-dimethylsuccinic anhydride are added, at 180° C., to the prepolymer obtained in the first stage. After 2 hours at this temperature, and when the reaction mixture is transparent, the polyester obtained has the following characteristics:

| | |
|---|---|
| IA: | 33.5 mg of KOH/g |
| IOH: | 2.9 mg of KOH/g |
| ICI viscosity at 200° C.: | 3900 mPa · s |
| $\overline{M}n$: | 3080 |

The polyester containing tertiary carboxyl groups which is thus obtained is cooled to 180° C. and removed from the flask.

EXAMPLE 7

Two-stage Synthesis of a Semi-crystalline Polyester Containing Primary Carboxyl Groups First Stage:

459.4 parts of 1,6-hexanediol are placed in the same flask as in Example 1. The contents of the flask are heated to a temperature of 150° C. under nitrogen and with stirring, and 579.5 parts of terephthalic acid and 2.5 parts of n-butyltin trioctanoate are added thereto. The reaction is continued at 235° C. at atmospheric pressure until 95% of the theoretical amount of water has distilled off. A prepolymer containing hydroxyl groups is thus obtained which has the following characteristics:

| | |
|---|---|
| Acid number: | 5.0 mg of KOH/g |
| Hydroxyl number: | 53.0 mg of KOH/g |
| ICI viscosity at 175° C.: | 800 mPa · s |

Second Stage:

101.3 parts of adipic acid are added, at 200° C., to the prepolymer obtained in the first stage and the mixture is heated to 235° C. After 2 hours at this temperature, 1.0 part of tributyl phosphite is added and the contents of the flask are placed under a pressure of 50 mmHg. After 2 hours at this temperature and under this pressure, the polyester obtained has the following characteristics:

| | |
|---|---|
| IA: | 32.0 mg of KOH/g |
| IOH: | 0.5 mg of KOH/g |
| ICI viscosity at 200° C.: | 1500 mPa · s |

-continued

| | |
|---|---|
| Tg (DSC; 20° C./min): | 28° C. |
| Melting range (DSC; 20° C./min): | 100–130° C. |
| $\overline{M}n$: | 3450. |

The semi-crystalline polyester bearing primary carboxyl groups, which is thus obtained, is cooled to 160° C. and removed.

EXAMPLE 8

One-stage Synthesis of a Semi-crystalline Polyester Bearing Primary Carboxyl Groups 500.0 parts of 1,4-cyclohexanediol, 655.1 parts of adipic acid and 2.5 parts of n-butyltin trioctanoate are placed in the same flask as in Example 1. The mixture is then heated to 140° C., under nitrogen and with stirring, and the esterification water begins to distil off at 190° C. Heating is continued gradually to a temperature of 200° C. When the distillation at atmospheric pressure stops, 1.0 part of tributyl phosphite and 1.0 part of n-butyltin trioctanoate are added and the contents of the flask are placed under a pressure of 50 mmHg. After 5 hours at this temperature and under this pressure, the polyester obtained has the following characteristics:

| | |
|---|---|
| Acid number: | 23.5 mg of KOH/g |
| Hydroxyl number: | 2.5 mg of KOH/g |
| ICI viscosity at 175° C.: | 3600 mPa.s |
| ICI viscosity at 150° C.: | 8000 mPa.s |
| Tg (DSC; 20° C./min): | 40° C. |
| Melting range: | 90–130° C. |
| $\overline{M}n$: | 4320 |

The semi-crystalline polyester bearing primary carboxyl groups thus obtained is cooled to 160° C. and removed.

COMPARATIVE EXAMPLES 9 to 13

Comparative Example 9 relates to the two-step synthesis, according to the procedure in the first two steps of Example 1, of a totally condensed linear polyester bearing aromatic carboxyl groups. This polyester is well known in the state of the art.

In Comparative Example 10, a polyester very similar to that of Comparative Example 9 was synthesized, and was prepared in the same way with complete condensation, but with introduction of a small amount of monomers known for their plasticizing effect. This linear polyester bearing aromatic carboxyl groups improves the melt flow of the powder containing it, by virtue of the presence of the plasticizing monomers.

In Comparative Example 11, a polyester very similar to that of Comparative Example 9 was prepared, and was prepared in the same way as in that example, but stopping the synthesis before the condensation was complete. On account of its incomplete condensation, this linear polyester bearing aromatic carboxyl groups has a lower number-average molecular weight than the polyester of Comparative Example 9, which improves its melt flow, as well as lower functionality, which reduces the reactivity of the powder containing it.

Comparative Example 12 relates to a polyester containing the same monomers as the polyester of Example 1 according to the invention, but it was prepared as in Example 1 in three steps, except that the order of steps 2 and 3 was reversed. By working in this way, it is observed that the hydroxypivalic acid is incorporated into the polyester in the second step of the synthesis, by reaction between the primary hydroxyl groups of the prepolyester bearing hydroxyl groups, obtained in the first step, and the tertiary carboxyl group of the hydroxypivalic acid, which leads to a prepolyester bearing hydroxyl groups derived from the hydroxypivalic acid. The third step of the synthesis leads to a carboxylation with the isophthalic acid, which gives a non-plasticized, completely condensed linear polyester bearing aromatic carboxyl groups, which is similar to the polyester of Comparative Example 9.

In Comparative Example 13, an attempt was made to prepare a polyester having the same monomer composition as the polyester of Example 1 according to the invention, but performing the process in a single step, as in patent application EP 634,434. This synthesis was not possible, since the polycondensation stopped at a very early stage to give a reaction mixture of milky appearance in which the terephthalic acid precipitates in large amounts.

Table 2 summarizes the amounts of monomers used in the synthesis of the polyesters of Comparative Examples 9 to 12, as well as the synthetic steps and the characteristics of the prepolyesters and final polyesters obtained. In this Table 2, the abbreviations used are the same as those in Table 1. In addition, the abbreviations below denote the following:

| | |
|---|---|
| EG | ethylene glycol |
| AdA | adipic acid |

TABLE 2

| | Example 9 | Example 10 | Example 11 | Example 12 |
|---|---|---|---|---|
| | First step | | | |
| NPG | 420.1 | 377.3 | 426.8 | 395.5 |
| EG | — | 32.8 | — | — |
| TPA | 603.9 | 543.5 | 613.6 | 568.7 |
| iPA | — | 67.2 | — | — |
| Catalyst | 1.3 | 1.3 | 1.3 | 1.3 |
| IA (mg KOH/g) | 9.6 | 7.0 | 8.9 | 9.5 |
| IOH (mg KOH/g) | 59.6 | 56.8 | 58.6 | 56.0 |
| ICI (175° in mPa.s) | 1900 | 1600 | 2000 | 2500 |
| | Second step | | | |
| iPA | 113.1 | 83.9 | 104.1 | — |
| Ada | — | 34.3 | — | — |
| HPA | — | — | — | 69.4 |
| Catalyst | 1.0 | 1.0 | 1.0 | 1.0 |
| Antioxidant | 1.0 | 1.0 | 1.0 | 1.0 |
| IA (mg KOH/g) | 34.0 | 32.1 | 30.8 | 6.5 |
| IOH (mg KOH/g) | 3.3 | 3.0 | 11.5 | 45.0 |
| ICI (200° C. in mPa.s) | 4700 | 3100 | 4100 | 4200 (175° C.) |
| $\overline{M}n$ | 3000 | 3200 | 2650 | — |
| Tg in ° C. (DSC; 20° C./min) | 55 | 53 | 52 | — |

TABLE 2-continued

|  | Example 9 | Example 10 | Example 11 | Example 12 |
|---|---|---|---|---|
|  |  | Third step |  |  |
| iPA | — | — | — | 110.9 |
| Catalyst | — | — | — | 1.0 |
| IA (mg KOH/g) | — | — | — | 31.7 |
| IOH (mg KOH/g) | — | — | — | 2.0 |
| ICI (200° C. in mPa.s) | — | — | — | 5900 |
| Tg in ° C. (DSC; 20° C./min) | — | — | — | 52 |
| $\overline{Mn}$ | — | — | — | 3300 |

EXAMPLE 14

Preparation of Thermosetting Powder Compositions and Characteristics of the Coatings Thereby Obtained Starting with the polyesters bearing tertiary carboxyl groups of Examples 1 to 6 according to the invention and with the polyesters bearing carboxyl groups obtained in the Comparative Examples 9 to 12, a series of powders which can be used for manufacturing coatings is prepared. As seen in Table 3, the semi-crystalline polyesters obtained in Examples 7 and 8 were also added to some of these formulations. The following three different types of formulations were prepared, one of white colour (formulation A), the other of dark brown colour (formulation B) and the third of green colour (formulation C):

| A) binder | 700.0 parts |
|---|---|
| titanium dioxide (1) | 300.0 parts |
| fluidity modifier (2) | 10.0 parts |
| benzoin | 3.5 parts |
| B) binder | 804.0 parts |
| Bayferrox 130 (3) | 45.0 parts |
| Bayferrox 3950 (3) | 140.0 parts |
| FW 2 (4) | 11.0 parts |
| fluidity modifier (2) | 10.0 parts |
| benzoin | 3.5 parts |
| C) binder | 670.0 parts |
| titanium dioxide (1) | 40.0 parts |
| Sicomin L 1522 (5) | 240.0 parts |
| Heliogene Blue K 7090 (6) | 10.0 parts |
| Carbon Black Flammruss 101 (7) | 40.0 parts |
| fluidity modifier (2) | 10.0 parts |
| benzoin | 3.5 parts |
| (1) Kronos 2310 (Kronos) | |
| (2) Resiflow PV5 (Worlee) | |
| (3) (Bayer) | |
| (4) (Degussa) | |
| (5) (BASF) | |
| (6) (BASF) | |
| (7) Degussa | |

The binder in these formulations always contains the crosslinking agent, as well as either the polyester bearing tertiary carboxyl groups according to the invention as sole polyester (compositions 15 to 23 and 27), or such a polyester mixed with a semi-crystalline polyester bearing carboxyl groups (compositions 24 to 26), or, for comparison, a polyester bearing aromatic carboxyl groups (compositions 28 to 33), as indicated in Table 3.

The compositions are prepared by dry-mixing and homogenization of the various constituents in an L/D 15/1 16 mm Prism twin-screw extruder, at an extrusion temperature of 85° C. The homogenized mixture is then cooled and ground in a Retsch ZM100 grinder, with a screen diameter of 0.5 mm. The powder thus obtained is screened so as to obtain a particle size of from 10 to 100 micrometers. In the case of compositions 24 to 26, containing two polyesters, these are mixed together in the molten state in a round-bottomed flask, prior to the operations described above.

The compositions, formulated as described above, were applied, using a GEMA-Volstatic PCG1 electrostatic spray gun, at a voltage of 60 kV, to untreated, cold-rolled steel plates, in a film thickness of from 50 to 70 micrometers. The coats deposited then undergo heating in an air-ventilated oven, at a temperature of 200° C., for a period of 15 minutes. The cured coatings thus obtained are subjected to the standard tests. The results obtained are reported in Table 3.

In this table, the 1st column gives the number of the composition prepared in Example 14, the 2nd column, the type of formulation, A, B or C, the 3rd column, the example number for the preparation of the polyester bearing tertiary carboxyl groups used, with the amount used (compositions 15 to 27) and of the comparative polyester bearing aromatic carboxyl groups (compositions 28 to 33), the 4th column, the example number for the preparation of the semi-crystalline polyester bearing carboxyl groups, with the amount used (which represents 10% by weight of the semi-crystalline polyester, relative to the entire weight of the polyesters; compositions 24 to 26), the 5th column, the nature and amount of crosslinking agent used, with the following abbreviations:
XL: Primid XL 552 from the company EMS, a beta-hydroxyalkylamide of formula III in which $R^3$ represents a hydrogen atom;
QM: Primid QM 1260 from the company EMS, a beta-hydroxyalkylamide of formula III in which $R^3$ represents a methyl group;
GMA: GMA252 from the company Estron Chemical Inc., a glycidyl acrylic copolymer.

the 6th and 7th columns, the value of the impact strength, in kg/cm, reverse impact and direct impact respectively, the 8th column, the visual evaluation of the quality of the surface appearance of the coatings, in which:
(b) indicates a perfectly smooth and correctly taut appearance, like that of a mirror,
(m) indicates a much poorer appearance than (b), with the start of an orange-peel skin,
(tm) indicates a pronounced orange-peel skin appearance, the 9th column, the Delta-b* value (Δb*), which indicates the resistance to hydrolysis, as explained at the start of the examples, the 10th column, the gloss, measured at an angle of 60°.

TABLE 3

| Composition | Type of formulation | Polyester containing tertiary carboxyl | Semi-crystalline polyester | Cross-linking agent | Impact strength Reverse | Impact strength Direct | Appearance | Δb* | Gloss 60° |
|---|---|---|---|---|---|---|---|---|---|
| 15 | A | EX 1: 665.0 | — | XL: 35.0 | 200 | 200 | b | — | 96 |
| 16 | A | EX 2: 668.5 | — | XL: 31.5 | 180 | 180 | b | — | 95 |
| 17 | A | EX 6: 665.0 | — | XL: 35.0 | 160 | 140 | b | — | 94 |
| 18 | A | EX 1: 661.5 | — | QM: 38.5 | 200 | 200 | b | — | 95 |
| 19 | A | EX 3: 665.0 | — | QM: 35.0 | 180 | 160 | b | — | 95 |
| 20 | C | EX 1: 636.5 | — | XL: 33.5 | 180 | 180 | b | 5.0 | 92 |
| 21 | C | EX 1: 633.2 | — | QM: 36.8 | 160 | 120 | b | 3.8 | 93 |
| 22 | C | EX 4: 636.5 | — | QM: 33.5 | 160 | 140 | b | 4.0 | 92 |
| 23 | B | EX 1: 759.8 | — | QM: 44.2 | 160 | 180 | b | — | 95 |
| 24 | A | EX 5: 598.5 | EX 7: 66.5 | XL: 35.0 | 160 | 140 | b | — | 93 |
| 25 | C | EX 5: 569.9 | EX 7: 63.3 | QM: 36.8 | 140 | 120 | b | 3.6 | 94 |
| 26 | A | EX 5: 595.4 | EX 8: 66.1 | QM: 38.5 | 160 | 160 | b | — | 93 |
| 27 | A | EX 1: 574.0 | — | GMA: 162.0 | 200 | 200 | b | — | 95 |
| 28* | A | EX 9: 665.0 | — | XL: 35.0 | 180 | 160 | tm | — | 94 |
| 29* | A | EX 11: 666.8 | — | XL: 33.2 | 80 | 60 | m | — | 90 |
| 30* | A | EX 9: 661.5 | — | QM: 38.5 | 180 | 180 | tm | — | 91 |
| 31* | A | EX 12: 666.8 | — | XL: 33.2 | 180 | 180 | tm | — | 92 |
| 32* | C | EX 10: 636.5 | — | XL: 33.5 | 160 | 160 | m | 15 | 93 |
| 33* | B | EX 9: 759.8 | — | QM: 44.2 | 180 | 160 | tm | — | 92 |

The compositions labelled $^{a*n}$ are tested for comparative purposes

As seen in Table 3, the coatings obtained with the compositions containing a polyester bearing tertiary carboxyl groups, in accordance with the invention, have a very high-quality surface—which is smooth and correctly taut, without an orange-peel appearance (compositions 15 to 27). These coatings also have very good flexibility (compositions 15, 18 and 27, for example), which is at least equal to, if not better than, that of the coatings in the state of the art (compositions 28, 30, 32 and 33, for example), as shown by their impact strength. The resistance to hydrolysis of these coatings is also very good, as shown by compositions 20 to 22 and 25 according to the invention. With the compositions also containing a semi-crystalline polyester (compositions 24 to 26), a further improved surface appearance is obtained in certain cases; in contrast with the compositions in patent application WO 91/14745, the addition of a semi-crystalline polyester to the compositions according to the invention results in virtually no increase in the rate of crosslinking.

In contrast, the coatings obtained with the comparative compositions each have, one or other, defects. None of these coatings have a surface appearance which is as good as with the compositions of the invention. Moreover, it is observed that if it desired to obtain a good surface appearance using an incompletely condensed polyester, in order to make it flow more easily on melting (composition 29), the flexibility deteriorates. If, for the same purpose, a composition containing a polyester prepared using plasticizing monomers is used (composition 32), good flexibility is found, but the resistance to hydrolysis becomes very poor.

In conclusion, it should be noted that by using the polyesters bearing tertiary carboxyl groups according to the invention in thermosetting powder compositions, coatings are obtained which have, simultaneously, an excellent appearance, excellent flexibility and very good resistance to hydrolysis, i.e. a combination of properties which it is not possible to find assembled with the compositions containing polyesters bearing carboxyl groups of the state of the art.

EXAMPLE 15

Resistance to Bad Weather of the Coats of Paint

In this example, the resistance to bad weather of coats of paint obtained with composition 23 in accordance with the invention is compared with that of coats obtained with composition 33 not in accordance with the invention.

The pigmented powders formulated according to the B type, as described in Example 14, are applied by electrostatic spray-gun onto chromium-plated aluminium panels under the same conditions as in Example 14.

The coats were subjected to an accelerated ageing test in order to estimate the resistance to bad weather (Q-UV test), as described at the start of the examples. Table 4 gives the gloss values for the coats of paint, measured at an angle of 60°, every 200 hours, until the reduction in the gloss reaches about 50% of its initial value, this initial value being set at 100%.

TABLE 4

| Hours | Composition 23 | Composition 33 |
|---|---|---|
| 0 | 100 | 100 |
| 200 | 100 | 100 |
| 400 | 99 | 99 |
| 600 | 99 | 98 |
| 800 | 97 | 97 |
| 1000 | 93 | 92 |
| 1200 | 90 | 90 |
| 1400 | 85 | 84 |
| 1600 | 80 | 78 |
| 1800 | 77 | 74 |
| 2000 | 66 | 65 |
| 2200 | 59 | 56 |
| 2400 | 55 | 52 |
| 2600 | 54 | 50 |
| 2800 | 49 | 46 |
| 3000 | 45 | 43 |

As can be seen on reading Table 4, the coating obtained according to the invention, with a composition containing a polyester bearing tertiary carboxyl groups, has excellent resistance to bad weather, which is comparable with that of a coating obtained with a composition known in the state of the art.

What is claimed is:

1. A thermosetting powder composition, comprising a beta-hydroxyalkylamide cross-linking agent and a polyester having terminal tertiary carboxyl groups, said polyester being prepared by reacting (a) 8.1 to 35 moles of an aliphatic or cycloaliphatic polyol with (b) 9.1 to 36 moles of an aliphatic, cycloaliphatic or aromatic polycarboxylic acid to form a prepolyester, and then by reacting said prepolyester with (c) 1.6 to 2.8 moles of an aliphatic, cycloaliphatic or aromatic compound having a tertiary carboxyl group, and either a primary or secondary carboxyl group or a primary or secondary hydroxyl group, the number of moles of (a), (b) and (c) being relative for 1 mole of said polyester, and said polyester having an acid number of from 15 to 50 mg KOH/g.

2. The thermosetting powder composition according to claim 1, wherein said polyol (a) is at least one of neopentyl glycol, 2,2-butylethyl-1,3-propanediol, neopentyl glycol hydroxypivalate, 1,4-cyclohexanedimethanol, trimethylolpropane, ditrimethylolpropane or pentaerythritol.

3. The thermosetting powder composition according to claim 1, wherein said polyol (a) comprises from 40 to 100% by weight of neopentyl glycol, relative to the total weight of said polyol (a).

4. The thermosetting powder composition according to claim 1, wherein said polycarboxylic acid (b) is at least one of isophthalic acid, terephthalic acid, phthalic acid, phthalic anhydride, 1,2-cyclohexanedicarboxylic acid, 1,3-cyclohexanedicarboxylic acid or 1,4-cyclohexanedicarboxylic acid.

5. The thermosetting powder composition according to claim 1, wherein said polycarboxylic acid (b) comprises from 85 to 100% by weight of terephthalic acid or isophthalic acid or both, relative to the total weight of said polycarboxylic acid (b).

6. The thermosetting powder composition according to claim 1, wherein said compound (c) is represented by formula I,

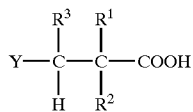

in which

R$^1$ and R$^2$ are the same or different and each is an alkyl group containing from 1 to 12 carbon atoms, a cycloalkyl group or an aryl group;

Y is a carboxyl or hydroxyl group;

R$^3$ is a hydrogen atom or has the same meaning as R$^1$ or R$^2$.

7. The thermosetting powder composition according to claim 1, wherein said compound (c) is hydroxypivalic acid, 2,2-dimethylsuccinic acid or 2,2-dimethylsuccinic anhydride.

8. The thermosetting powder composition according to claim 1, wherein said polyester has a hydroxyl number of from 0 to 10 mg of KOH/g, a number-average molecular weight of from 1800 to 10,500, a functionality of from 1.6 to 2.8, an ICI viscosity at 200° C. of from 10 to 10,000 mPa.s and a glass transition temperature of between 45 and 85° C.

9. The thermosetting powder composition according to claim 1, wherein said beta-hydroxyalkylamide crosslinking agent is represented by formula III:

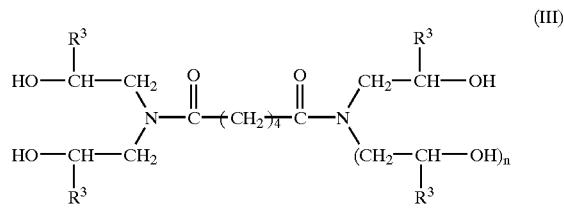

wherein n is 0.2 to 1 and R$^3$ is a hydrogen atom or methyl group.

10. The thermosetting powder composition according to claim 1, further comprising up to 40% by weight of a semi-crystalline polyester having carboxyl groups, relative to the total weight of said semi-crystalline polyester and said polyester having tertiary carboxyl groups.

11. The thermosetting powder composition according to claim 10, wherein said semi-crystalline polyester is a condensation product of a stoichiometric excess of an aliphatic, cycloaliphatic or aromatic polycarboxylic acid with an aliphatic or cycloaliphatic polyol, has an acid number between 10 and 70 mg of KOH/g, has a number-average molecular weight from 1600 to 17,000, has a glass transition temperature from 10 to 50° C., has a melting range from 70 to 150° C., and has an ICI viscosity from 10 to 10,000 mPa.s, at 175° C.

12. The thermosetting powder composition according to claim 10, wherein 0.25 to 1.4 equivalents of carboxyl groups in said polyester having terminal tertiary carboxyl groups and said optional semi-crystalline polyester having carboxyl groups are used per equivalent of functional groups in said beta-hydroxyalkylamide crosslinking agent.

13. The thermosetting powder composition according to claim 1, further comprising up to 10% by weight, relative to the total weight of the composition, of a compound which absorbs UV light, a light-stabilizer, a pigment, a filler, a fluidity modifier, a plasticizer, or a combination thereof.

14. The thermosetting powder composition according to claim 1, wherein said polyester is prepared by:

condensing said polycarboxylic acid (b) with a stoichiometric excess of said polyol (a), to form a prepolyester having hydroxyl groups, condensing the prepolyester with an additional amount of said polycarboxylic acid (b), excluding terephthalic acid, to form a prepolyester having carboxyl groups, and condensing the prepolyester having carboxyl groups with said compound (c).

15. The thermosetting powder composition according to claim 1, wherein said polyester is prepared by:

condensing said polycarboxylic acid (b) with a stoichiometric excess of said polyol (a), to form a prepolyester having hydroxyl groups, and condensing the prepolyester with said compound (c) having a tertiary carboxyl group, and a primary or secondary carboxyl group.

16. The thermosetting powder composition according to claim 1, wherein said polyester is prepared by:

condensing said polyol (a) with a stoichiometric excess of said polycarboxylic acid (b), excluding terephthalic acid, to form a prepolyester having carboxyl groups, and condensing the prepolyester with said compound (c) having a terminal carboxyl group, and a primary or secondary hydroxyl group.

17. A process for coating an article, which comprises coating an article with said thermosetting powder composition according to claim 1 in a fluidized bed or by spraying with an electrostatic or triboelectric spray gun, and heating said coating at a temperature of from 160 to 225° C. for a period of from 5 to 30 minutes.

18. An article of manufacture, which is coated by the process according to claim 17.

19. An article of manufacture, which is coated with said thermosetting powder composition according to claim 1.

20. A metallic article which is coated with said thermosetting powder composition according to claim 1.

* * * * *